JAMES D. STURGES.

Improvement in Cooling and Mixing Soap.

No. 4,729. Reissued Jan. 30, 1872.

Witnesses:

Henry F. Bruns.

J. W. Munday

Inventor:

James D. Sturges

UNITED STATES PATENT OFFICE.

JAMES D. STURGES, OF CHICAGO, ILLINOIS.

IMPROVEMENT IN COOLING AND MIXING SOAPS.

Specification forming part of Letters Patent No. 114,063, dated April 25, 1871; reissue No. 4,729, dated January 30, 1872.

DIVISION A.

SPECIFICATION A.

I, JAMES D. STURGES, of Chicago, in the county of Cook and State of Illinois, have invented certain Improvements in Apparatus for Cooling, Mixing, and Conveying Soap or other like substance; and I do hereby declare that the following is a full, clear, and exact description thereof, to enable others skilled in the art to make and use the same, reference being had to the accompanying drawing and the letters and figures marked thereon which form part of this specification, and in which—

Figure 1:
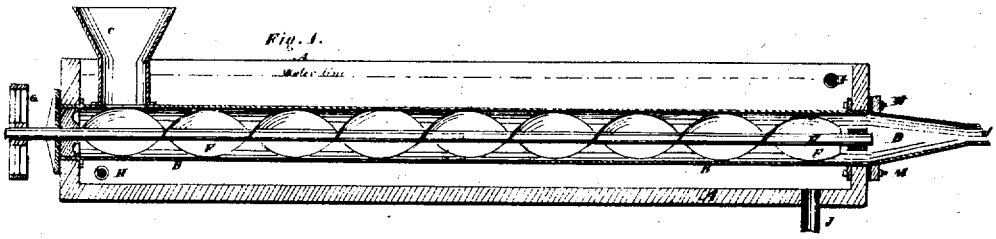
Figure 2:
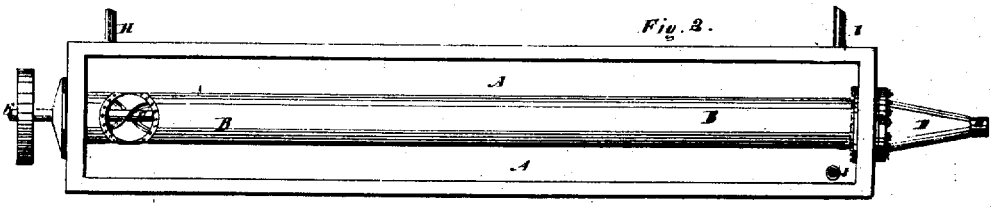
Figure 3:
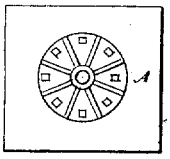
Figure 4:
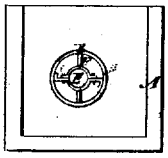
Figure 5:
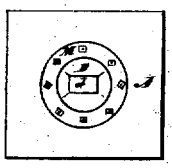

Figure 1 is a central longitudinal section of my invention; Fig. 2, a top or plan view with the hopper removed; Fig. 3, an end view, showing the head-piece at the left of Figs. 1 and 2; Fig. 4, an end view of the right hand with head-piece removed; and Fig. 5, an end view at the right hand of Figs. 1 and 2.

*General Description.*

In large factories where caldrons are used large enough to manufacture several tons of soap at once, the handling, crutching, or mixing and cooling of the soap after it is made is a great labor. It is usually poured into large molds, holding a thousand pounds or more, and there stirred and allowed to cool, after which it is cut up into large plates or slices, and subdivided again and again, until the usual-sized cakes are produced, such as are known to the general trade. My invention relates to a machine into which the soap may be poured, introduced, or drawn from the caldron, and which mixes or crutches the soap, and at the same time forces it through a pipe surrounded or cooled by water kept at a low temperature, which cools the soap, after which it is discharged from an aperture of a proper form and size, where appropriate machinery may be placed to shape it into bars or cakes of any desired size or length. My machine may be used for many other purposes of a like nature in other manufactures than that of soap.

Like letters of reference employed in the drawing indicate the same part in the several figures.

A is a trough or box, made water-tight, and of substantial material. B is a hollow cylinder or pipe suspended in the trough or box, being supported by passing through the ends of said box. C is a pipe or funnel communicating with the tube B, and by means of which said tube may be filled with the hot soap or other substance. D is a funnel-shaped discharge, terminating in an orifice, *d*, through which the material is discharged after being cooled, as will appear. E is a shaft passing through the center of the tube or cylinder B, and carrying a spiral flange or flanges, F. This flange may be broken or continuous, as may be thought best, for the working of such substance as may be desired. The shaft E is rotated by power applied to the band-wheel G, or by a crank or gearing in lieu thereof, as desired. The trough or box A is supplied with water by means of the supply-pipe H, keeping up a constant supply of cool water, which is kept from running over by the escape or vent pipe I, placed near the upper line of the said trough, while a discharge-pipe, J, situated at the bottom of the trough, furnishes a means of clearing the trough entirely of water. K is a head-plate attached to the end of the trough or box, and furnishing a bearing for the shaft E. L is a bearing for the other end of said shaft, being supported by braces from the tube B. M is a head-plate, which serves to secure the tube D to the box or trough A.

These details of construction may, of course, be somewhat varied as to the means of securing the tube in the box and of providing a bearing for the shaft E.

The operation of my invention will be as follows: Hot soap or other material is introduced from the caldron into the pipe C, from whence it passes into the tube B, through which it is forced at any desired speed, and stirred by the flanges F upon the shaft E, the said shaft being driven by any usual power. As the soap passes through the tube it is cooled by the water surrounding said tube, and by the time it reaches the further end is in the desired condition, and passes out through the discharge D, whose orifice, *d*, gives the proper form, and as it passes out appropriate machinery may be adapted to form it into suita- By my invention I save a vast amount of labor and time, while, by reason of the crutching or mixing action of the spiral flanges in the tube B, I produce a better quality of soap and save the labor of crutching or mixing. By varying the pitch of the spiral flange, the length of the tube and tank, the velocity of the shaft, or the temperature of the water, the material passing through the tube B may be discharged at different degrees of coolness or mixture.

The discharge-pipe D is adjustable, and there may be many of various shapes, any one of which can be used, as desired, according to the form it is intended for the soap or other material to assume as it issues from the apparatus.

I do not, broadly, claim the cooling of soap in tubes surrounded by water, for this I am well aware has been hitherto done. Nor do I broadly claim forcing the soap from the tubes by pneumatic, hydrostatic, or piston pressure, or by displacement with hot soap, for this has also been done, as I know.

I am also well aware that soap has been forced from tubes in the form of long bars after having been cooled in said tubes—as, for instance, in patent of Silas R. Divine, August 7, 1869—and I, therefore, do not lay any claim to such process. My invention has great advantage over such method or mechanism, in the fact that the flow of soap from the discharge-orifice is constant, the soap having become cooled to any degree desired before reaching that point. A further advantage lies in the fact that such ingredients as are necessary to mix with the soap after it has sufficiently boiled may be throughly mixed and incorporated therewith in the cooling-tube by the action of the spiral flanges of the shaft. Now, if I allowed the soap to stand in the tube until it had become cool through the whole length, there would have to be exerted a powerful pressure to dislodge and force it out, and it would also be impossible to mix anything with it; but by my arrangement the liquid soap is admitted hot at one end, and by the time it has hardened, stiffened, or congealed it has arrived at the discharge-orifice, through which it is continuously discharged.

The action of the spiral flanges, by stirring and changing the contents of the tube, and by bringing every part of said contents in contact with the cooling-surface, materially hastens the cooling; this is not done in case the tube contains no shaft, as in the above-mentioned patent.

*Claims.*

Having thus described the construction and operation of my invention, what I claim, and desire to secure by Letters Patent, is—

1. The apparatus for cooling, conveying, and mixing soap, consisting of a screw or spirally-flanged shaft inclosed in a hollow tube, into which the soap may be poured hot, and from which it escapes, being forced out by the screw, as specified and shown.

2. The combination of the tube B, discharge D, and spirally-flanged shaft E F, for the purposes and substantially as described and shown.

JAMES D. STURGES.

Witnesses:
J. W. MUNDAY,
HEINR. F. BRUNS.